United States Patent [19]

Gorder

[11] Patent Number: 4,629,123

[45] Date of Patent: Dec. 16, 1986

[54] CROP SPRAYER

[76] Inventor: Norman S. Gorder, Rte. 1, Gary, Minn. 56545

[21] Appl. No.: 542,575

[22] Filed: Oct. 17, 1983

[51] Int. Cl.[4] .................... B05B 1/20

[52] U.S. Cl. .................... 239/159; 239/172

[58] Field of Search .................... 239/164, 166–168, 239/172, 176; 47/1.7, 159, 162, 163

[56] References Cited

U.S. PATENT DOCUMENTS

| | | | |
|---|---|---|---|
| 809,046 | 1/1906 | Collins | 47/1.7 |
| 1,733,883 | 10/1929 | Jaecks | 239/172 |
| 1,883,479 | 10/1932 | Bateman et al. | 239/168 |
| 2,273,344 | 2/1942 | Black et al. | 239/166 |
| 2,712,198 | 7/1955 | Smith | 239/164 |
| 3,016,653 | 1/1962 | Gardner | 47/1.7 |
| 3,548,787 | 6/1971 | Thomason | 47/1.7 |
| 3,959,924 | 6/1976 | Allen | 47/1.7 |
| 4,274,589 | 6/1981 | Jones | 239/172 |

FOREIGN PATENT DOCUMENTS

| | | | |
|---|---|---|---|
| 1056306 | 1/1967 | United Kingdom | 239/164 |

*Primary Examiner*—Joseph F. Peters, Jr.
*Assistant Examiner*—Scott D. Malpede
*Attorney, Agent, or Firm*—Herman H. Bains

[57] ABSTRACT

The sprayer is designed to be operated on standing crops by utilizing a rounded boom with a deflector plate at the front to gently deflect the crops and induce mechanical turbulence into which the liquid to be sprayed is introduced so as to provide complete coverage of the crop. Large spans are accommodated by providing folding booms which are held in place by front and rear sets of cables. The height of the booms is adjustable to accommodate the particular crop being sprayed.

7 Claims, 6 Drawing Figures

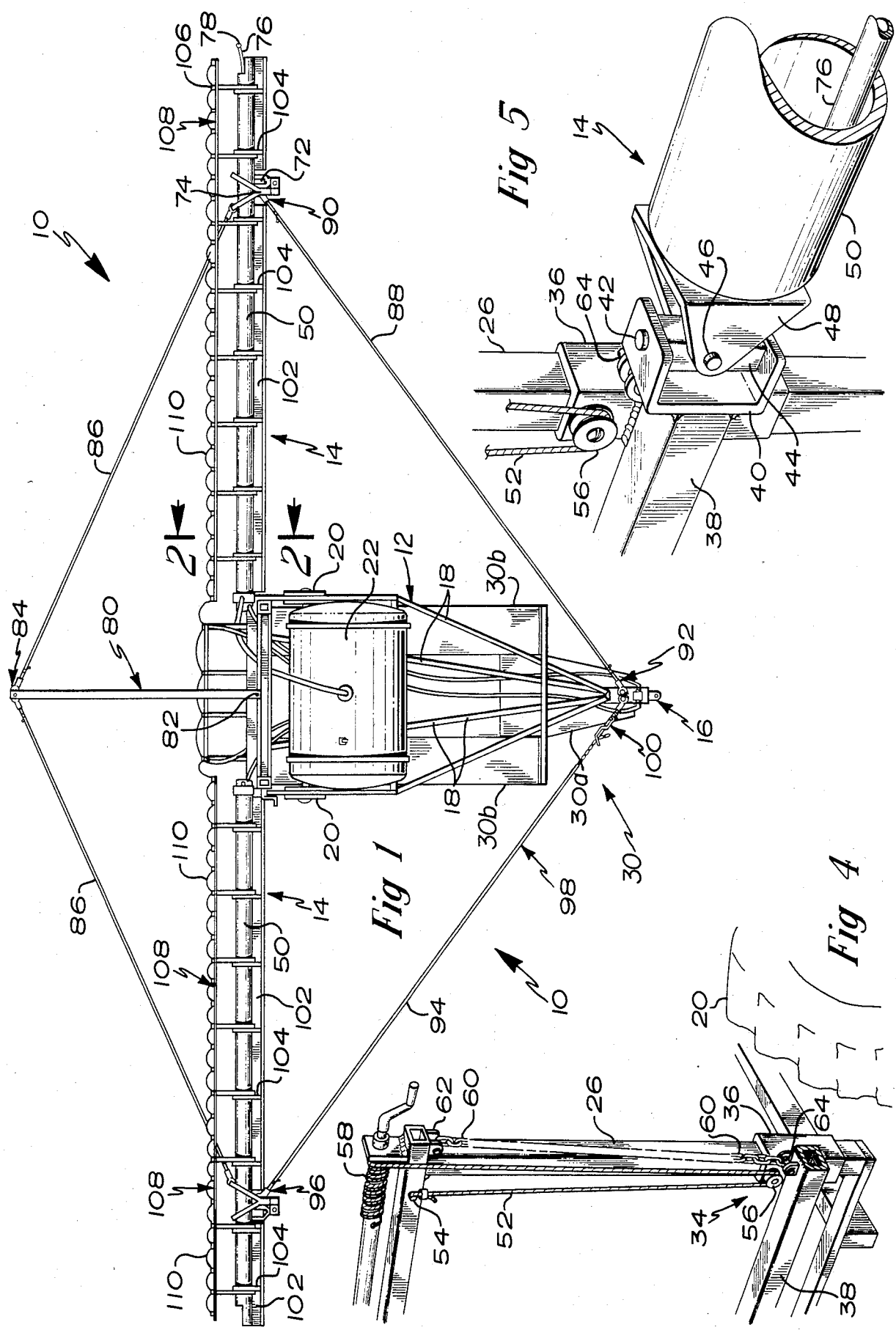

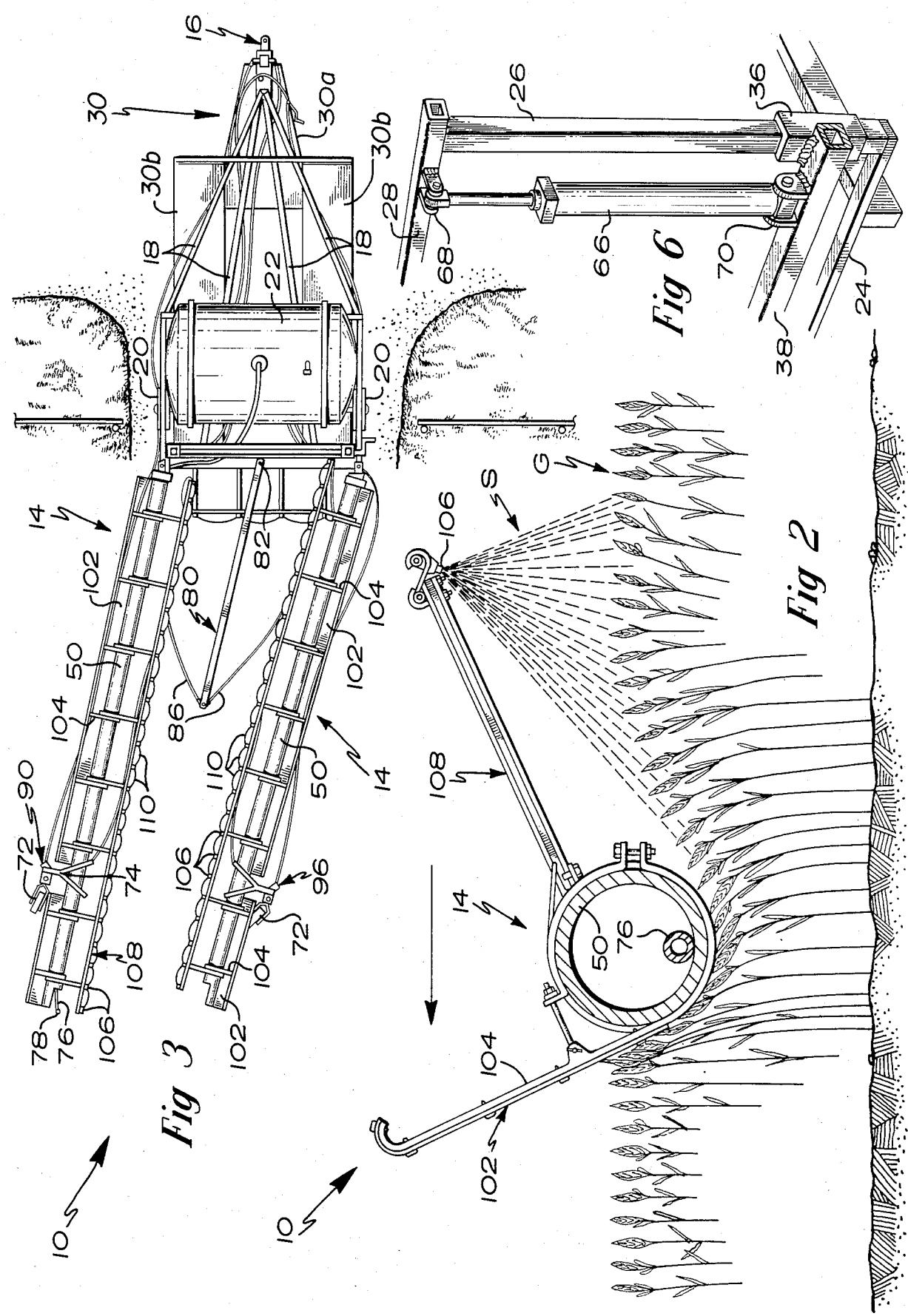

CROP SPRAYER

BACKGROUND OF THE INVENTION

At present, spraying of crops with herbicides, insecticides and other agricultural chemicals is generally undertaken in one of two ways. First, spraying is generally done before the crop has reached any appreciable height and thus, there is little risk of physical damage in so spraying. Such spraying in effect is spraying the ground and lodging the chemicals therein. Spraying on standing crops is generally undertaken with a crop duster; that is, by spraying from an airplane. In addition to the substantial expense involved in such spraying, such aerial spraying is to a certain extent inefficient because the chemicals must be sprayed in highly concentrated mixtures due to the load limitations of the airplanes. While the turbulence in the crop, induced by the passage of the plane over the field, does assist in promoting full coverage of the spray, that spray in high concentrations is not as effective as the same amount of chemical applied over the same area when more highly diluted.

While spraying of standing crops is known in Europe, it is the object of the present invention to produce a spraying device which is capable of spraying standing crops while minimizing damage to the crops as well as minimizing the number of passes required through the field. It is further an object of this invention to provide a spraying device which is adjustable in height to accommodate varying crop conditions, especially in view of the fact that the presently known sprayers are generally fixed at one height as those sprayers are not intended to be used on standing crops.

It is further an object of this invention to provide a sprayer which may be easily and inexpensively manufactured and yet which may be easily and conveniently operated, particularly in view of the desirably large size.

SUMMARY OF THE INVENTION

A central frame designed for towing behind a tractor is provided with a tank and associated pumping equipment. A boom extends outwardly from the frame on either side thereof. Each boom is generally of fairly large circular cross section and has attached to the rear thereof spaced upwardly and rearwardly therefrom nozzles extending the length of the boom. The large, round cross section of the boom provides a gentle mechanical turbulence in the grain which waves gently at the point where the spray nozzles pass across the grain thereby allowing full and complete coverage of the grain with the chemical. If desired, a generally flat deflector plate may be placed on the front of the boom extending forwardly and upwardly therefrom. In addition to helping deflect the grain to induce the aforementioned mechanical turbulence, the deflector plate also serves as a windshield thereby allowing the spray to lodge on the grain where it is desired to lodge and thereby increase the accuracy of the spraying.

The booms are mounted on an adjustable height mechanism which allows the booms to be adjusted depending upon the height of the crop being sprayed. The height adjustment mechanism is mainly located at the frame and raises and lowers the proximal ends of the booms upon command. Outboard wheels are provided at the distal end of each boom and those wheels also have provision for height adjustment to accommodate the distal end of the boom in a corresponding relationship to the height of the proximal end.

The booms are hingedly attached at their proximal ends to the frame so as to allow the folding of the booms for transport and/or storage. A front set of cables runs from the distal end of the booms forwardly to the tongue of the frame. At that frame they are attached and provision is made for tightening those cables as by means of a chain binder or the like. A rear set of chains extends from the distal ends of the booms rearwardly for attachment to a rear pivoting frame. The pivot frame is attached to the rearward end of the main frame and is able to pivot thereabout. Thus, for transport, the front cables are disconnected and the booms are allowed to swing rearwardly and are allowed to go around corners due to the pivoting action with the main frame and the ability of the rear frame to pivot. Were the frame not to be pivotable, this ease of cornering could not take place. Also, the provision of cables allows substantially large spans than would be available with the rigid types of rods used to locate the booms on conventional known sprayers.

Provision is also made for the location of a filling hose through the hollow circular booms such that rather than jockey the sprayer into position so that the tank can be filled directly from a reservoir, the driver need merely locate one distal end of one of the booms adjacent a source of water or chemical for filling.

These and other objects and advantages of the invention will appear more fully from the following description made in conjunction with the accompanying drawings wherein like reference characters refer to the same or similar parts throughout the several views.

DESCRIPTION OF THE DRAWING FIGURES

FIG. 1 is an overhead plane view of the sprayer in its operative position.

FIG. 2 is a sectional view taken along line 2—2 of FIG. 1.

FIG. 3 is an overhead plane view of the sprayer in the transport position.

FIG. 4 is a detailed view showing the height adjustment mechanism.

FIG. 5 is a detailed view showing the attachment of the boom to the height adjustment mechanism of FIG. 4.

FIG. 6 is a detailed view showing an alternative embodiment of the height adjustment mechanism.

DESCRIPTION OF THE PREFERRED EMBODIMENT

The sprayer, generally designated 10, of the instant invention is comprised generally of a main frame 12 and a pair of booms 14 extending from either side of the main frame 12 and is designed for attachment to a tractor or other vehicle which can tow sprayer 10 through a field. Extending rearwardly from tongue 16 are longitudinal rails 18 upon which are mounted main wheels 20 and tank 22. Lower rear frame rail 24 extends across the back of frame 12 and an upper rear frame rail 28 is spaced above lower rail 24 by means of rear uprights 26 (as shown in detail in FIG. 4). A belly pan 30 is located beneath main frame 12 and serves to allow the smooth passage of sprayer 10 over a standing crop and minimize the damage thereto. A tongue portion 30a of belly pan 30 extends forward beneath tongue 16 and skid portions 30b extend forwardly and upwardly from the point at which they join the main portion of belly pan 30.

A vertical adjustment mechanism is shown and designated in general as FIG. 34 and is shown in FIG. 4. In particular, a rectangular sleeve 36 is slidably mounted over rear upright 26. A crossbar 38 connects the two sleeves 36. A clevis 40 is located on outer ends of crossbar 38 as shown in FIG. 5. A pivot pin 42 connects clevis 40 to U-joint 44 while a second pivot point 46 connects U-joint 44 to clevis 48. In turn, clevis 48 is attached to the proximal end of boom tube 50. Boom tube 50 is preferably formed of eight inch diameter auger tubing although of course any other suitable material may be utilized as long as the diameter is sufficient as will be more fully described hereinafter.

The adjustment mechanism 34 is further comprised of a cable 52 which is attached at one end to cable mount 54 and thereafter passes about a pulley 56 located on sleeve 36 and thence upwardly terminating at a winch 58 mounted on upper rear frame rail 28. A chain 60 is utilized to maintain the adjustment which has initially been provided by winch 58 and in particular chain 60 is affixed at one end by pin 62 and at its other end by a removable pin 64. Thus, when the vertical adjustment mechanism 34 has reached the desired height, pin 64 may be placed through the appropriate length of chain to provide a height adjustment to booms 14.

An alternate embodiment of the height adjustment mechanism 34 shown in FIG. 4 is shown in FIG. 6. In particular, a hydraulic cylinder 66 extends between an upper attachment point 68 on upper rear frame rail 28 and a lower attachment point 70 on crossbar 38. While the manual mechanism shown in FIG. 4 has the advantage of being relatively inexpensive and uncomplicated, the hydraulic arrangement shown in FIG. 6 can be valuable to the farmer by allowing the farmer to raise and lower booms 14 as he travels through the field to suit crop conditions which might vary from one portion of the field to another.

Outboard wheels 72 are mounted toward the distal ends of booms 14. In particular, outboard wheels 72 are provided with an adjustable mounting point 74 which may be hydraulically adjusted or manually adjusted by means of a pin and multiple hole arrangement to allow coordination of the height of the distal end of booms 14 with the proximal end adjustment provided by mechanism 34.

As can be seen in FIGS. 1, 2, 3 and 5, a fill tube 76 runs through boom tube 50. In particular, fill tube 76 is designed to run from the distal end of boom 14 inwardly for connection to tank 22. The filling connector 78 is provided at the outboard end of fill tube 76 for connection to a source of water or mixed chemical which will be sprayed. Fill tube 76 can be run through one or both of booms 14 depending on the needs of the farmer and the layout of the farm. By providing such a remote connector 78, the sprayer 10 may be refilled without resorting to folding sprayer 10 into the transport position for refilling. Such provision also negates the need for long hoses which would normally be provided were the tank 22 to be filled directly from the liquid source.

A rear cable frame 80 extends rearwardly from rear frame rail 24 and 28 where it is pivotably mounted at mounting point 82. Attached at mounting point 84 at the rearward end of rear frame 80 are rear cables 86 which extend forwardly and outwardly to mounting points 74 on boom 14 distal ends. A first front cable 88 is attached at removable pin joint 90 to mounting point 74 and extends forwardly to pin joint 92 on tongue 16. Second front cable 94 extends from pin joint 96 forwardly and terminates in a chain section 98 adjacent tongue 16. A chain binder 100 is attached at one end to tongue 16 and engages chain section 98 at its other end to provide adjustment and allow the taking up of the slack in the various cables of the system.

Turning particularly to FIG. 2, a deflector panel 102 is mounted to the forward edge of boom tube 50 and extends forwardly and upwardly from boom 15. Deflector panel 102 is mounted on a mount 104 which is attached to boom tube 50. A plurality of nozzles 106 extends across the full width of sprayer 10 and is mounted to boom 14 by means of nozzle mount 108. As can be seen in FIG. 2, nozzles 106 are located above boom 14 and yet below the upper end of deflector plate 102. Nozzles 106 direct spray S downwardly on the grained G immediately behind boom 14. As boom 14 moves forwardly through the field, it contacts the grain and pushes it downwardly as shown in FIG. 2. After the grain is released, grain springs back upwardly and waves back and forth for a short while. This mechanically induced turbulence allows the spray S to effectively and completely cover the grain G and provides the most effective spraying of all parts of the plant. Nozzle piping 110 is conventional in nature and connects nozzles 106 with tank 22. Of course, it is contemplated that conventional pumping equipment and the like will also be utilized in this regard, but such equipment is not shown further due to its conventional nature.

Initially, sprayer 10 is in the operative position shown in FIG. 1. When it is desired to transport or store sprayer 10, one need merely release chain binder 100 and remove pin joints 90, 92 and 96 and thence, store cables 88 and 94 on the tractor or sprayer. By driving forwardly, booms 14 will swing rearwardly into the position shown in FIG. 3. Due to the pivoting of booms 14 as well as the pivotable nature of rear cable frame 80, sprayer 14 may be maneuvered through spaces much tighter than would be possible without the inventive arrangement.

While the preferred embodiments of the present invention have been described, it should be understood that various changes, adaptions and modifications may be made therein without departing from the spirit of the invention and the scope of the appended claims.

What is claimed is:

1. A crop sprayer for the spraying of standing crops in a field, said sprayer comprising:
   a main frame;
   at least one boom extending horizontally outwardly from said frame, said boom being generally hollow and circular in cross-section and having a diameter sufficiently great to prevent damage to crops when said boom contacts said crops;
   a plurality of spray nozzles, means rigidly attached to said booms and extending rearwardly and upwardly therefrom to position said spray nozzles above and behind said booms so that said nozzles spray the chemical into the mechanical turbulence in the crops caused by the movement of the booms across the crops to effectively cover the plants with the chemical spray;
   a tank for containing liquid to be sprayed; and
   means for filling said tank through said boom, said filling means extending the length of said boom.

2. A crop sprayer for spraying standing crops in a field with an agricultural liquid chemical spray, comprising:

a main frame having a front end, a rear end, and sides, a pair of elongate rigid booms, each extending horizontally outwardly from one side of said frame and each having an inner end and an outer end, means pivotally connecting the inner end of each boom with one side of said frame to permit pivoting movement therebetween about a vertical axis, each boom being of generally circular cross-sectional configuration and having a diameter sufficiently great to prevent damage to the crops and to produce mechanical turbulence in the crops by causing the plants to wave back and forth when the boom is moved through the standing crops in a field, a pair of ground-engaging wheels, each being connected to the outer end of one of said booms to support the same for travel over the surface of the ground, means for selectively adjusting the height of each wheel with respect to the surface of the ground, a pair of adjusting mechanisms, each interconnecting the inner end portion of each boom with the main frame, and each being adjustable for varying the height of the inner end of each boom with respect to the surface of the ground, said adjusting mechanisms cooperating with said ground-engaging wheels to permit adjustment of the height of booms for crops at various stages of growth, a plurality of spray nozzles, means rigidly attached to said booms and extending rearwardly and upwardly therefrom to position said spray nozzles above and behind said booms so that said nozzles spray the chemical into the mechanical turbulence in the crops caused by the movement of the booms across the crops to effectively cover the plants with the chemical spray, a substantially imperforate wind deflector plate extending substantially the length of said boom and smoothly forwardly and upwardly from said boom and terminating above said nozzles, and means interconnecting the outer end portions of the boom with the main frame to hold the booms in outwardly extending horizontal relationship with the main frame during forward and reverse movement of the crop sprayer.

3. The crop sprayer as defined in claim 2 and a smooth horizontally disposed belly pan attached to the bottom of said main frame and engaging the standing crop during movement of the crop sprayer through the field to thereby minimize damage to the crop plants.

4. The crop sprayer as defined in claim 2 wherein said booms are of hollow construction, a tank for containing the liquid chemical to be sprayed, and means for filling said tank through said boom, said filling means extending the length of the boom.

5. The crop sprayer as defined in claim 2 wherein each of said adjusting mechanisms comprises a winch.

6. The crop sprayer as defined in claim 2 wherein each of said adjusting mechanisms comprises a hydraulic cylinder and piston unit.

7. A crop sprayer for spraying standing crops in a field with an agricultural liquid chemical spray, comprising:

a main frame having a front end, a rear end, and having sides, a pair of elongate substantially similar rigid booms, each having an inner end and an outer end, and each extending horizontally outwardly from one side of said frame, pivot means connecting the inner end of each boom to the frame to permit pivoting movement of each boom about a vertical axis, said booms each being of generally circular cross-sectional configuration and each having a diameter sufficiently great to prevent damage to the crops as said boom engages the crops during movement of the sprayer through the field, a pair of ground-engaging wheels, each being connected with the outer end of one of said booms to support the same for travel over the surface of the ground, means for selectively adjusting the height of each wheel with respect to the surface of the ground, a pair of adjusting mechanisms, each interconnecting the inner end portion of one of said booms with said main frame and each being adjustable for varying the height of the inner end of each boom relative to the ground surface, a plurality of spray nozzles, means rigidly attached to said booms and extending rearwardly and upwardly therefrom to position said nozzles above and behind said booms so that said nozzles spray the chemical into the mechanical turbulence of the crops caused by movement of the booms to effectively cover the plants with the chemical spray, a pair of elongate front cables, each having one end thereof secured to the outer end of one of said booms and extending forwardly and inwardly therefrom, and each having the other end thereof connected to the front end portion of said main frame, an elongate pivot frame having one end thereof pivotally connected to the rear end of said main frame for pivotal movement about a vertical axis and extending rearwardly therefrom, a pair of elongate rear cables, each having one end thereof secured to the outer end portion of one of said booms and extending rearwardly and inwardly therefrom and having its other end secured to said pivot frame, said front and rear pairs of cables cooperating with each other to maintain the booms in horizontal generally right angular relationship with respect to said main frame during forward and reverse movement of the sprayer.

* * * * *